UNITED STATES PATENT OFFICE.

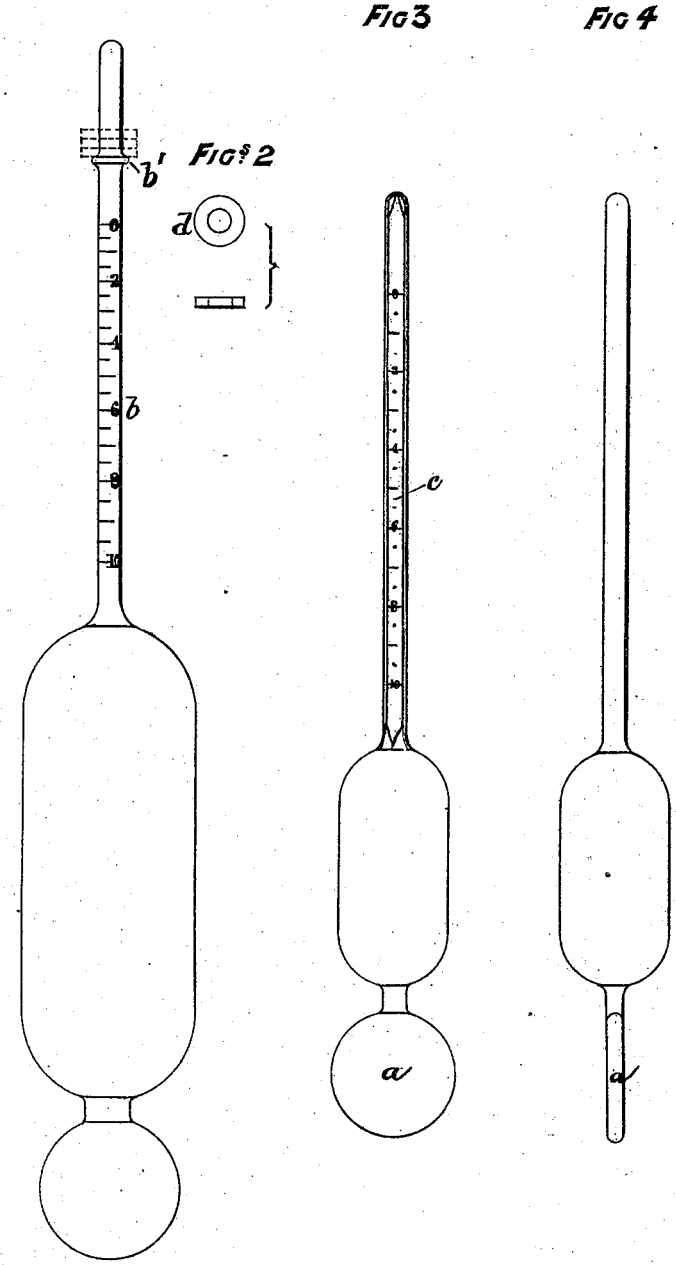

JAMES J. HICKS, OF HATTON GARDEN, ENGLAND.

IMPROVEMENT IN HYDROMETERS.

Specification forming part of Letters Patent No. 174,240, dated February 29, 1876; application filed February 3, 1876.

*To all whom it may concern:*

Be it known that I, JAMES JOSEPH HICKS, of Hatton Garden, in the county of Middlesex, England, have invented certain Improvements in Instruments (commonly called Hydrometers) for Testing the Specific Gravity of Liquids, of which the following is a specification:

In the accompanying drawings, Figure 1 is a front view of my improved hydrometer. Fig. 2 is a plan and edge view of one of the weights. Figs. 3 and 4 are front and side views, showing the inner tube and flat bulb respectively.

Heretofore hydrometers made of glass have had their stems made of clear or translucent glass, which, according to one plan, had the scales or graduations engraved on the outer surface thereof. This method, however, had the disadvantage that, after a short time, the scales or graduations became indistinct on account of the coloring matter becoming removed or washed out therefrom by contact with the liquid being tested, or otherwise.

According to other plans, the stems were, as before described, made of clear or translucent glass, but the scales or graduations were made upon a paper, ivory, or other scale fixed in the interior thereof by the aid of sealing-wax or springs. By these modes, however, difficulty was experienced in reading the indications on account of the refraction produced by the light passing through the thickness of the glass and through the water, while the scales were liable to become detached from the glass stem and shift their position, thereby rendering the instrument incorrect.

By the first part of my invention I obviate the above-mentioned difficulties. I form the stem *b* either partially or entirely of enamel, opal, or other like semi-transparent or opaque glass, and engrave the scale or graduations on the outer surface of the enamel, opal, or other like semi-transparent or opaque glass stem or part of stem. I also, according to my invention, fill in such engraving with glass enamel fused therein, or I dispense with the engraving and simply paint the scale or graduations thereon with glass enamel, which is afterward fused thereon. In carrying this part of my invention into effect I prefer to make the stem of black or other dark-colored glass, or glass enamel, and to mark the scale or graduations thereon in white or other light-colored enamel, although, if desired, the reverse may be used.

According to another plan, I form the stem of clear or translucent glass, and engrave or otherwise mark the scale or graduations on the outer surface thereof, as heretofore; but in order to render the scale or graduations readily visible I place in the interior of the stem a tube or strip of paper or other material of any desired or suitable color to render the scale or graduations more readily visible.

When a hydrometer is required for testing corrosive acids, I mark the scale or graduations on a glass or enamel tube, *c*, of any suitable color, in the manner before described; but I cause such scale-tube to fit closely the stem of the hydrometer, which stem is made of clear or translucent glass, and when the scale is in proper position I fix it on the stem and cause it to become one therewith by fusing the upper ends thereof together. This mode of manufacture protects the scale from the action of the acids, and at the same time prevents the shifting thereof in the stem. If desired, however, this mode of manufacture may be employed for any description of hydrometer.

The second part of my invention, which is represented at Figs. 1 and 2 of the accompanying drawings, relates to hydrometers for testing salt water or other liquids, in which an open scale is desirable. In carrying this part of my invention into effect I engrave or otherwise mark the stem *b*, which is provided with a collar, *b'*, with a scale or graduations, say, for example, from 0 to 10, as shown at Fig. 1; and in order to read to 40 grains of specific gravity I use three equal weights, *d*, at the upper end of the stem, as shown by dotted lines in Fig. 1, a plan and edge view of one of such weights being shown at Figs. 2. Thus, when it is desired to read from 10 to 20, a single weight is placed at the upper part of the stem; when from 20 to 30, two weights are so placed; and from 30 to 40 three of such weights are required.

By these means, on account of the weights not being immersed in the liquid being tested, I am enabled to dispense with the table of corrections required in Sykes' and other similar hydrometers, while, by employing equal weights, I obviate, to a great extent, the errors to which an inexperienced or careless operator is liable when using a number of unequal weights.

The third part of my invention, which is represented at Figs. 3 and 4 of the accompanying drawings, relates to a method of preventing, to a great extent, the rotation of the hydrometer in the liquid in which it is immersed. For this purpose I, according to my invention, form the mercury-bulb $a$ with flat sides, instead of making it globular, or spherical, or of other form, of circular section in horizontal planes, as heretofore, thereby causing it to offer more resistance to or obtain a better hold in the liquid in which it is immersed.

Having thus described the nature of my said invention, and the mode in which I carry the same into effect, I would have it understood that what I claim is—

1. The hydrometer-stem, partially or wholly of enamel, opal, or other analogous opaque or semi-transparent glass, having scales or graduations thereon, as and for the purpose set forth.

2. The stem having scales or graduations formed of glass enamel fused thereon.

3. The combination, with the stem, of the inner tube, having scales or graduations marked thereon.

4. The combination, with the glass stem $b$, provided with collar $b'$, of the weights applied to the upper part of the stem, as and for the purpose set forth.

5. A hydrometer constructed with a flat bulb, as and for the purpose set forth.

JAS. J. HICKS.

Witnesses:
B. J. B. MILLS,
C. M. WHITE,
Both of 23 Southampton Buildings, London.